US012317239B2

(12) United States Patent
Segev et al.

(10) Patent No.: US 12,317,239 B2
(45) Date of Patent: May 27, 2025

(54) APPARATUS, SYSTEM AND METHOD OF COMMUNICATION ACCORDING TO AN AUTOMATED FREQUENCY COORDINATION (AFC) ALLOCATION SCHEME

(71) Applicant: INTEL CORPORATION, Santa Clara, CA (US)

(72) Inventors: Jonathan Segev, Tel Mond (IL); Qinghua Li, San Ramon, CA (US); Hassan Yaghoobi, San Jose, CA (US); Emily H. Qi, Gig Harbor, WA (US); Feng Jiang, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 1006 days.

(21) Appl. No.: 17/133,960

(22) Filed: Dec. 24, 2020

(65) Prior Publication Data
US 2021/0120556 A1   Apr. 22, 2021

(51) Int. Cl.
*H04W 72/0453* (2023.01)
*H04L 69/28* (2022.01)
*H04W 24/10* (2009.01)
*H04W 72/044* (2023.01)

(52) U.S. Cl.
CPC ......... *H04W 72/0453* (2013.01); *H04L 69/28* (2013.01); *H04W 24/10* (2013.01); *H04W 72/0473* (2013.01)

(58) Field of Classification Search
CPC ............. H04W 72/0453; H04W 24/10; H04W 72/0473; H04L 69/28
See application file for complete search history.

(56) References Cited

U.S. PATENT DOCUMENTS 11,057,259 B2 * 7/2021 Yeo ................. H04W 76/11
11,283,562 B1 * 3/2022 Chao ............... H04W 72/0453
(Continued)

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

(Continued)

*Primary Examiner* — Ajay Cattungal
(74) *Attorney, Agent, or Firm* — Shichrur & Co.

(57) ABSTRACT

For example, an AP device, which includes a co-located AP set of a plurality of APs, may be configured to configure the plurality of APs to communicate over a respective plurality of wireless communication channels in a 6 GHz frequency band according to an Automated Frequency Coordination (AFC) allocation scheme including a plurality of AFC allocations for the plurality of wireless communication channels, respectively, wherein the plurality of AFC allocations corresponds to a plurality of different coverage areas relative to the AP device; to monitor an estimated distance between a STA and the AP device; and to instruct the STA to communicate with the co-located AP set over an assigned wireless communication channel of the plurality of wireless communication channels.

25 Claims, 5 Drawing Sheets

(56) References Cited

U.S. PATENT DOCUMENTS

| | | | | |
|---|---|---|---|---|
| 2008/0117871 | A1* | 5/2008 | Olexa | H04W 72/542 370/329 |
| 2016/0044711 | A1* | 2/2016 | Lou | H04B 7/0617 370/338 |
| 2016/0255660 | A1* | 9/2016 | Son | H04B 7/0619 370/329 |
| 2017/0163333 | A1* | 6/2017 | Breiling | H04B 7/15592 |
| 2019/0090279 | A1* | 3/2019 | Sun | H04W 16/14 |
| 2019/0124584 | A1* | 4/2019 | Parikh | H04W 16/14 |
| 2019/0132729 | A1* | 5/2019 | Cariou | H04W 12/80 |
| 2019/0239092 | A1* | 8/2019 | Zhou | H04B 7/0695 |
| 2019/0313260 | A1* | 10/2019 | Zhang | H04W 16/26 |
| 2019/0313314 | A1* | 10/2019 | Yang | H04W 24/10 |
| 2020/0236558 | A1* | 7/2020 | Damnjanovic | H04W 74/04 |
| 2020/0260289 | A1* | 8/2020 | Macmullan | H04W 16/14 |
| 2020/0337054 | A1* | 10/2020 | Kwok | H04W 48/18 |
| 2020/0359229 | A1* | 11/2020 | Macmullan | H04W 24/02 |
| 2020/0367020 | A1* | 11/2020 | Ansley | H04W 16/14 |
| 2020/0413491 | A1* | 12/2020 | Ansley | H04W 92/02 |
| 2021/0058856 | A1* | 2/2021 | Qi | H04W 76/14 |
| 2021/0067993 | A1* | 3/2021 | Kazmi | H04W 24/10 |
| 2021/0084697 | A1* | 3/2021 | Damnjanovic | H04L 5/0053 |
| 2021/0144724 | A1* | 5/2021 | Macmullan | H04W 16/14 |
| 2021/0282183 | A1* | 9/2021 | Wang | H04W 74/02 |
| 2021/0352542 | A1* | 11/2021 | Chang | H04W 48/18 |
| 2021/0367866 | A1* | 11/2021 | Strauch | H04W 76/10 |
| 2022/0007363 | A1* | 1/2022 | Wang | H04W 72/0453 |
| 2022/0053430 | A1* | 2/2022 | Chande | H04W 52/243 |
| 2022/0070834 | A1* | 3/2022 | Raghavan | H04B 7/086 |
| 2022/0095120 | A1* | 3/2022 | Panje | H04B 17/318 |
| 2022/0095321 | A1* | 3/2022 | Liu | H04L 5/0032 |
| 2022/0132377 | A1* | 4/2022 | Santhanam | H04W 36/00692 |
| 2022/0141673 | A1* | 5/2022 | Flesch | H04W 52/243 370/329 |
| 2022/0141681 | A1* | 5/2022 | Flesch | H04B 17/382 370/252 |
| 2022/0150734 | A1* | 5/2022 | Nimbalker | H04L 1/0038 |
| 2022/0159585 | A1* | 5/2022 | Aldana | H04W 52/243 |
| 2022/0174512 | A1* | 6/2022 | Rune | H04W 24/10 |
| 2022/0174777 | A1* | 6/2022 | Zhu | H04W 76/16 |
| 2022/0191876 | A1* | 6/2022 | Sharma | H04B 17/318 |
| 2022/0225337 | A1* | 7/2022 | Fan | H04W 24/10 |
| 2022/0264584 | A1* | 8/2022 | Fan | H04L 5/0051 |
| 2022/0353696 | A1* | 11/2022 | Shreevastav | G01S 5/0036 |
| 2023/0070695 | A1* | 3/2023 | Ansley | H04W 92/02 |
| 2023/0361894 | A1* | 11/2023 | Bhamri | H04W 24/10 |
| 2023/0370146 | A1* | 11/2023 | Wang | H04W 76/19 |
| 2023/0397026 | A1* | 12/2023 | Chennichetty | H04W 24/02 |
| 2024/0179737 | A1* | 5/2024 | Tsai | H04L 27/0006 |

OTHER PUBLICATIONS

IEEE P802.11ax/D8.0 Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Oct. 2020, 820 pages.

WiFi Alliance AFC System Baseline Description, Version 0.2, Mar. 29, 2020, 19 pages.

* cited by examiner

APPARATUS, SYSTEM AND METHOD OF COMMUNICATION ACCORDING TO AN AUTOMATED FREQUENCY COORDINATION (AFC) ALLOCATION SCHEME

TECHNICAL FIELD

Aspects described herein generally relate to communication according to an Automated Frequency Coordination (AFC) allocation scheme.

BACKGROUND

A wireless communication frequency band, e.g., a 6 Gigahertz (GHz) band, may be utilized for communication by incumbent radios. Other devices, e.g., WiFi radios, may be required to honor the incumbent radios, when using the wireless communication frequency band. For example, a transmission power of non-incumbent radios, e.g., WiFi radios, may be restricted, for example, to ensure that any interference from the non-incumbent radios to the incumbent radios will be low enough, e.g., 6 decibel (dB) below received incumbent signal power.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements; Part 11: Wireless LAN Medium Access Control (MAC) and Physical Layer (PHY) Specifications*, Dec. 7, 2016); and/or IEEE 802.11ax (*IEEE P802.11ax/D8.0 Draft Standard for Information technology-Tele-communications and information exchange between systems Local and metropolitan area networks Specific requirements, Part 11: Wireless LAN Medium Access Control (MAC) and Physical Layer (PHY) Specifications, Amendment 1: Enhancements for High Efficiency WLAN*, October 2020)) and/or future versions and/or derivatives thereof, devices and/or networks operating in accordance with existing WiFi Alliance Standards (including WiFi Alliance AFC System Baseline Description, Version 0.2, Mar. 29, 2020) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a 6 Gigahertz (GHz) frequency band. However, other aspects may be implemented utilizing any other suitable wireless communication frequency bands, for example, a 2.4 GHz frequency band, a 5 GHz frequency band, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a WLAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Figure 1:
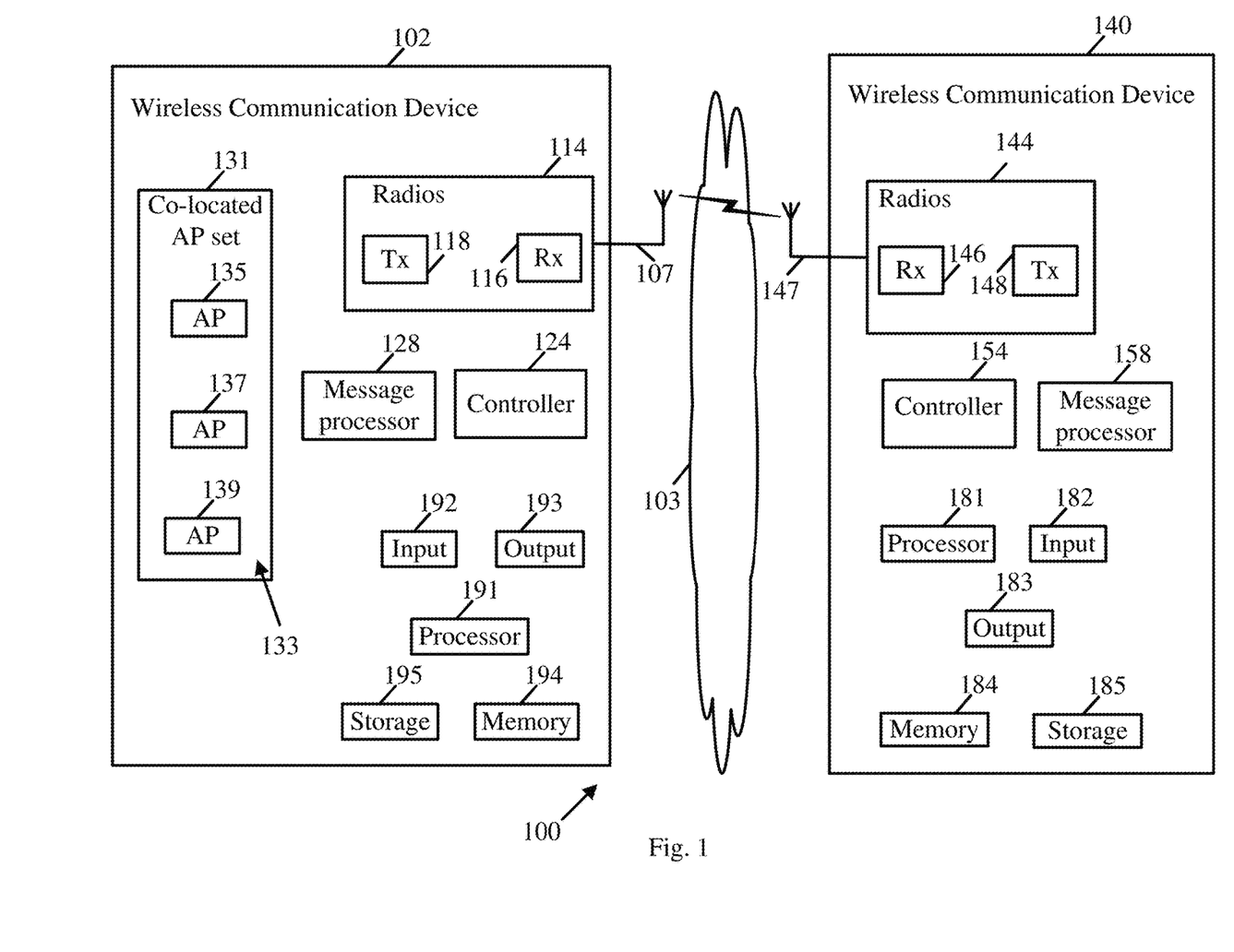
FIG. 1 is a schematic block diagram illustration of a system, in accordance with some demonstrative aspects.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one more other devices.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a 6 GHz wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 6 GHz band, and/or any other band, for example, a 2.4 GHz band, a 5 Ghz band, a directional band, e.g., an mmWave band, a 5G band, an S1G band, and/or any other band.

In some demonstrative aspects, radios 114 and/or 144 may include, or may be associated with one or more antennas.

In some demonstrative aspects, device 102 may include one or more antennas 107, and/or device 140 may include on or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU;

at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of one or more radios 114, and/or at least part of the functionality of message processor 158 may be implemented as part of one or more radios 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or the one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 may be configured operate as, perform the role of, and/or perform one or more functionalities of, an access point (AP) STA. For example, device 102 may include an AP device.

In some demonstrative aspects, device 140 may be configured to operate as, perform the role of, and/or perform one or more functionalities of, a non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects, device 102 may include, operate as, perform a role of, and/or perform the functionality of, one or more multi-AP entities, e.g., as described below.

In some demonstrative aspects, controller 124 may be configured to control, perform and/or to trigger, cause, instruct and/or control device 102 to operate as, perform a role of, and/or perform one or more operations and/or functionalities of, an AP device including a co-located access point AP set 131, e.g., as described below.

In some demonstrative aspects, a co-located AP set may include a set of two or more APs in the same physical device. For example, APs in the co-located set may be allowed to operate on the same channel or on different channels. For example, APs that are part of the co-located AP set and that are operating on the same channel may form a co-hosted Basic Service Set Identifier (BSSID) set or a multiple BSSID set. In one example, a co-hosted BSSID set may include a collection of APs, e.g., such that all APs use a common operating class, channel, receive antenna connector, and/or transmit antenna connector, and/or such that each AP advertises information for its BSSID using Beacon or Probe Response frames. In other aspects, the co-located AP set may perform any other additional or alternative functionalities.

In some demonstrative aspects, co-located access point AP set 131 may include a plurality of AP STAs 133, e.g., including AP STAs 135, 137 and/or 139. In some aspects, as shown in FIG. 1, co-located access point AP set 131 may include three AP STAs. In other aspects, co-located access point AP set 131 may include any other number of AP STAs.

In some demonstrative aspects, for example, the one or more radios 114 may include, for example, a radio for communication by AP STA 135 over a first wireless communication frequency channel, e.g., a first channel in the 6 GHz band, as described below.

In some demonstrative aspects, for example, the one or more radios 114 may include, for example, a radio for communication by AP STA 137 over a second wireless communication frequency channel, e.g., a second channel in the 6 GHz band, as described below.

In some demonstrative aspects, for example, the one or more radios 114 may include, for example, a radio for communication by AP STA 139 over a third wireless communication frequency channel, e.g., a third channel in the 6 GHz band, as described below.

In some demonstrative aspects, the radios 114 utilized by AP STAs 133 may be implemented using separate radios. In other aspects, the radios 114 utilized by AP STAs 133 may be implemented by one or more shared and/or common radios and/or radio components.

In some demonstrative aspects, controller 124 may be configured to control one or more operations and/or functionalities of device 102 for communication over a wireless communication frequency band, e.g., the 6 GHz band, which may be utilized for communication by incumbent radios. For example, device 102 may be required to honor the incumbent radios, when using the wireless communication frequency band.

In some demonstrative aspects, for example, controller 124 may be configured to restrict a transmission power of non-incumbent devices, e.g., device 140, which may communicate with device 102. For example, the transmission of the non-incumbent devices may be restricted to ensure that any interference from the non-incumbent devices to the incumbent radios will be low enough, e.g., 6 decibel (dB) below received incumbent signal power.

In some demonstrative aspects, controller 124 may be configured to control one or more operations and/or functionalities of device 102 according to one ore more location-based regulations, which may be set, for example, by a regulatory organization, e.g., the Federal Communications Commission (FCC) in the United States, or any other regulatory organization in other countries.

In some demonstrative aspects, controller 124 may be configured to control one or more communications of device 102 and/or device 140, for example, based on an allocation of one or more allowed channels and/or bandwidths, e.g., which may be assigned by the regulatory organization.

In some demonstrative aspects, controller 124 may be configured to cause device 102 to instruct one or more client STAs, e.g., device 140, to set and/or restrict a transmission power and/or any other parameter, for communication over a channel in the 6 GHz band, e.g., as described below.

In some demonstrative aspects, controller 124 may be configured to set and/or restrict one or more parameters for communication by devices 102 and/or 140, for example, based on one or more assignments of allowed resources. For example, the allowed resources may define one or more allowed channels and/or bandwidths for communication, and/or one or more restrictions, e.g., allowed transmission power, for communication over the allowed channels and/or bandwidths.

For example, the assignments of allowed resources may be location-dependent, and may depend, for example, on a known location of devices 102 and/or 140. For example, the assignments of allowed resources may take into consideration both the AP and client STA positions, for example, as interference to the incumbent devices may be the result of transmissions by either the AP or the client STA. In one example, knowledge of a better accuracy of a location of an AP, e.g., device 102, and a client STA, e.g., device 140, may allow more possibilities for channel and/or bandwidth availability.

In some demonstrative aspects, controller 124 may be configured to set and/or restrict one or more parameters for communication by devices 102 and/or 140, for example, according to an Automated Frequency Coordination (AFC) allocation scheme, e.g., as described below.

In one example, the AFC allocation scheme may be configured according to an AFC reference incumbent protection methodology, which may use link budget analyses to ensure that a Fixed Service (FS) received interference-to-noise power ratio (I/N) resulting from a Radio LAN (RLAN) device does not exceed a single-entry interference protection criteria (IPC) specified in terms of an I/N threshold.

In some demonstrative aspects, controller 124 may be configured to identify an AFC assignment of allowed resources, e.g., including assignment of allowed channel/BW and/or transmit power, for example, based on one or more messages from a server, e.g., a trusted cloud server, and/or from any other source.

In some demonstrative aspects, the AFC assignment for an AP device, e.g., device 102, may be based, for example, on a report from the AP, which may include, for example, a location report of a location of the AP, and information relating to a location of the client STA. For example, the information relating to a location of the client STA may be provided in the form of an uncertainty estimation of location of the client STA.

In some demonstrative aspects, there may be a need to provide a technical solution for efficient and/or accurate utilization of the AFC assignments, e.g., as described below.

For example, the AFC assignments may be provided to the AP device with respect to a relatively extended period of time, for example, a period of 24 hours, or longer periods, e.g., periods of about a month.

However, as client STAs may be mobile in nature, there may be a very high uncertainty level with respect to the estimated location of a client STA, for example, if a location of the client STA is not continuously measured.

In such a situation, the AP may be required to use a most stringent, e.g., limiting, AFC assignment, for example, in order to ensure that the regulatory restrictions are met, for example, if the accurate location of the client STA cannot be determined.

For example, the AP may be required to always assume a worst scenario regarding the location of the client STA, e.g., by always assuming that the client STA is at a farthest range from the AP.

For example, in this case, the AP may be restricted to using an AFC assignment, which only takes into consideration the location of the AP and the maximal transmit power. Such an AFC assignment may be very limiting and inefficient.

In one example, it may be insufficient to have the AP determine the AFC assignment with respect to a single client STA location, as AFC assignments may be for relatively long durations, e.g., between 24 hours and 30 days or any other period. Accordingly, due to the mobile nature of the client STAs, it may not be feasible to account for changes in the locations of individual client STAs, for example, if the AP uses a same operating channel for all client STAs served by the AP.

In some demonstrative aspects, controller 124 may be configured to cause, trigger and/or control the plurality of APs 133 of co-located AP set 131 to communicate over a respective plurality of wireless communication channels in the 6 GHz frequency band, for example, according to an AFC allocation scheme, e.g., as described below.

In some demonstrative aspects, controller 124 may be configured to cause, trigger and/or control the plurality of APs 133 of co-located AP set 131 to operate as multiple logical independent APs, for example, such that each AP of APs 133 may operate over its own operational channel.

In some demonstrative aspects, controller 124 may be configured to cause, trigger and/or control the plurality of APs 133 to operate according to the AFC allocation scheme, for example, by configuring the plurality of APs 133 to use a respective plurality of AFC allocated channels, e.g., as described below. For example, an AP, e.g., each AP, of co-located AP set 131, may be configured to use a separate AFC allocated channel, e.g., as described below.

In some demonstrative aspects, the plurality of AFC allocated channels may be configured, for example, with respect to a same AP physical location, for example, corresponding to the location of device 102, e.g., as described below.

In some demonstrative aspects, the plurality of AFC allocated channels may be configured, for example, with respect to a plurality of different location uncertainties and/or different ranges to client STAs, e.g., as described below.

For example, APs 133, e.g., each of AP 133, of the co-located AP set 131 may report a same location with different uncertainty values.

For example, an uncertainty measurement may be used to account for the dynamically measured distance from the AP device 102 to the client STAs.

In some demonstrative aspects, controller 124 may be configured to cause, trigger and/or control an AP of APs 133, which is in communication with a client STA, e.g., device 140, to request from the client STA to continuously report its location and/or its range from device 102, e.g., as described below.

In some demonstrative aspects, controller 124 may be configured to cause, trigger and/or control the AP, which is in communication with the client STA, to request from the client STA to continuously report its location and/or its range from device 102, for example, based on range measurements of Fine Time Measurement (FTM) protocol, e.g., as described below.

In other aspects, the location and/or range of the client STA may be measured and/or monitored based on any other range and/or location measurement mechanism and/or protocol.

In some demonstrative aspects, controller 124 may be configured to cause, trigger and/or control one or more APs of the co-located AP set 131 to dynamically direct client STAs, e.g., device 140, to use an appropriate channel, for example, based on the monitored location and/or range of the client STAs, e.g., as described below.

In some demonstrative aspects, controller 124 may be configured to cause, trigger and/or control one or more APs of the co-located AP set 131 to dynamically assign an operating channel to c client STA, e.g., device 140, for example, based on the location of the client STA, for example, such that the client STA is within the coverage area of the allowed AFC channel, e.g., as described below.

In some demonstrative aspects, controller 124 may be configured to trigger, cause, instruct and/or control APs 133 to communicate over a respective plurality of wireless communication channels in the 6 GHz frequency band according to an AFC allocation scheme, which may include a plurality of AFC allocations for the plurality of wireless communication channels, respectively, e.g., as described below.

In some demonstrative aspects, the plurality of AFC allocations may correspond to a plurality of different coverage areas relative to device 102, e.g., as described below.

In some demonstrative aspects, an AFC allocation for a wireless communication channel may include an allocation of a maximal Transmit (Tx) power for transmission over the wireless communication channel. In other aspects, the AFC allocation for the wireless communication channel may include any other additional or alternative allocation and/or restriction for communicating over the wireless communication channel.

In some demonstrative aspects, controller 124 may be configured to trigger, cause, instruct and/or control device 102 to monitor an estimated distance between a STA, e.g., device 140, and device 102, e.g., as described below.

In some demonstrative aspects, the plurality of AFC allocations may correspond to a plurality of different uncertainty values, respectively, which may be applied to a same AP location value corresponding to a location of the device 102, e.g., as described below.

In some demonstrative aspects, the AFC allocation for the wireless communication channel may be based on a maximal distance in a coverage range corresponding to the wireless communication channel.

In some demonstrative aspects, controller 124 may be configured to trigger, cause, instruct and/or control device 102 to instruct the STA, e.g., device 140, to communicate with the co-located AP set 131 over an assigned wireless communication channel of the plurality of wireless communication channels, e.g., as described below.

In some demonstrative aspects, the assigned wireless communication channel may have an AFC allocation corresponding to a coverage area, which covers the estimated distance between the STA, e.g., device 140, and device 102, e.g., as described below.

In some demonstrative aspects, controller 124 may be configured to trigger, cause, instruct and/or control device 102 to instruct the STA, e.g., device 140, to switch between communication channels of the plurality of wireless communication channels for communication with the co-located AP set 131, for example, based on an identified movement of the STA between the coverage areas, e.g., as described below. For example, controller 124 may be configured to trigger, cause, instruct and/or control co-located APs 133 to command the client STA 140 to move, e.g., together with its entire data, signaling and STA state, from one co-located AP operating channel of one of APs 133 to another co-located AP operating channel of another one of APs 133.

In some demonstrative aspects, the plurality of coverage areas may be defined, for example, with respect to a plurality of different maximal distances from device 102, e.g., as described below.

In some demonstrative aspects, an AFC allocation for a coverage area may be based on a maximal distance from the device 102 according to the coverage area, e.g., as described below.

In some demonstrative aspects, a maximal Tx power according to the AFC allocation for the coverage area may be based on the maximal distance from the device 102 according to the coverage area, e.g., as described below.

In some demonstrative aspects, controller 124 may be configured to trigger, cause, instruct and/or control device 102 to instruct the STA, e.g., device 140, to communicate with the co-located AP set 131 over a first assigned wireless communication channel according to a first AFC allocation corresponding to a first coverage area, for example, when the estimated distance between the STA and device 102 is in the first coverage area, e.g., as described below.

In some demonstrative aspects, controller 124 may be configured to trigger, cause, instruct and/or control device 102 to instruct the STA, e.g., device 140, to switch to communicate with the co-located AP set 131 over a second assigned wireless communication channel according to a second AFC allocation corresponding to a second coverage area, for example, when the estimated distance between the STA and the AP device is in the second coverage area, e.g., as described below.

In some demonstrative aspects, the first coverage area may be defined according to a first maximal distance from the device 102, and/or the second coverage area may be defined according to a second maximal distance from the device 102, e.g., different from the first maximal distance from device 102.

In some demonstrative aspects, the first AFC allocation corresponding to the first coverage area may define a first maximal Tx power, and/or the second AFC allocation corresponding to the first coverage area may define a second maximal Tx power, e.g., different from the first maximal Tx power.

In some demonstrative aspects, the maximal distance from device 102 according to the second coverage area may be greater than the maximal distance from the device 102 according to the first coverage area.

In some demonstrative aspects, the maximal Tx power according to the first AFC allocation may be greater than the maximal Tx power according to the second AFC allocation.

In other aspects, the coverage areas may be defined according to any other additional or alternative parameter.

In some demonstrative aspects, controller 124 may be configured to determine the estimated distance between the STA, e.g., device 140, and the device 102, for example, based on a location measurement report from the STA, e.g., as described below.

In some demonstrative aspects, controller 124 may be configured to trigger, cause, instruct and/or control device 102 to send to the STA, e.g., to device 140, a request for the location measurement report, e.g., as described below.

In some demonstrative aspects, controller 124 may be configured to trigger, cause, instruct and/or control device 102 to generate the request for the location measurement report to include a reason indication to indicate that the location measurement report is requested to support the AFC allocation scheme.

In some demonstrative aspects, controller 124 may be configured to set a predefined reason field in the request for the location measurement report to indicate that the location measurement report is requested to support the AFC allocation scheme.

In some demonstrative aspects, the location measurement report from the STA, e.g., from device 102, may be based on an exchange of messages of a ranging measurement between an AP of the co-located AP set 131 and the STA, e.g., as described below.

In some demonstrative aspects, the location measurement report from the STA, e.g., from device 140, may include an Initiator-to-Responder (I2R) Location Measurement Report (LMR) based on an exchange of messages of a Fine Timing Measurement (FTM) protocol between an AP of the co-located AP set 131 and the STA, e.g., as described below.

In some demonstrative aspects, controller 124 may be configured to command the client STA, e.g., device 140, to utilize a single FTM instance for measuring ranges to the set of co-located APs 131, e.g., one at a time, as described below.

In some demonstrative aspects, an associated state of the client STA may be shared, for example, across all APs 133 of the collocated AP set 131.

In some demonstrative aspects, APs 133 of the collocated AP set 131 may be configured to share a same address, e.g., a same MAC address.

In some demonstrative aspects, controlling APs 133 to communicate over the plurality of wireless communication channels in the 6 GHz frequency band according to the AFC allocation scheme, e.g., as described herein, may provide a technical advantage to support an AP in making full use of the 6 GHz AFC channels. For example, this technical advantage may not be achieved by a solution, which may limit the AP to use only a single, fixed, channel with a longest allowed range, which may have very limited available channels, BW and power combinations.

In some demonstrative aspects, controlling APs 133 to communicate over the plurality of wireless communication channels in the 6 GHz frequency band according to the AFC allocation scheme, e.g., as described herein, may provide a technical advantage to support an AP in serving client STAs, for example, based on their temporal position/range, for example, instead of limiting the AP to a worst possible range.

In some demonstrative aspects, controlling APs 133 to communicate over the plurality of wireless communication channels in the 6 GHz frequency band according to the AFC allocation scheme, e.g., as described herein, may provide a technical advantage to support an efficient use of an FTM session, e.g., even a single FTM session, across a plurality of co-located APs of the same physical device, e.g., some or all of the APs 133 of co-located AP set 131 of device 102. For example, the ability to utilize the FTM session by the APs 133 of co-located AP set 131 may provide a technical solution with reduced, e.g., minimized, medium overhead of the FTM session, and/or with reduced, e.g., minimized, power overhead and/or scheduling conflicts for maintaining the FTM session/s by the client STA, e.g., device 140.

In some demonstrative aspects, controlling APs 133 to communicate over the plurality of wireless communication channels in the 6 GHz frequency band according to the AFC allocation scheme, e.g., as described herein, may provide a technical advantage to support AFC allocations in an efficient manner, for example, by moving the management of the link to the AP using the client reports. Accordingly, this management of the AFC allocations may provide a technical advantage by obviating bottle necks at a trusted server, which provides the AFC allocations.

Figure 2:
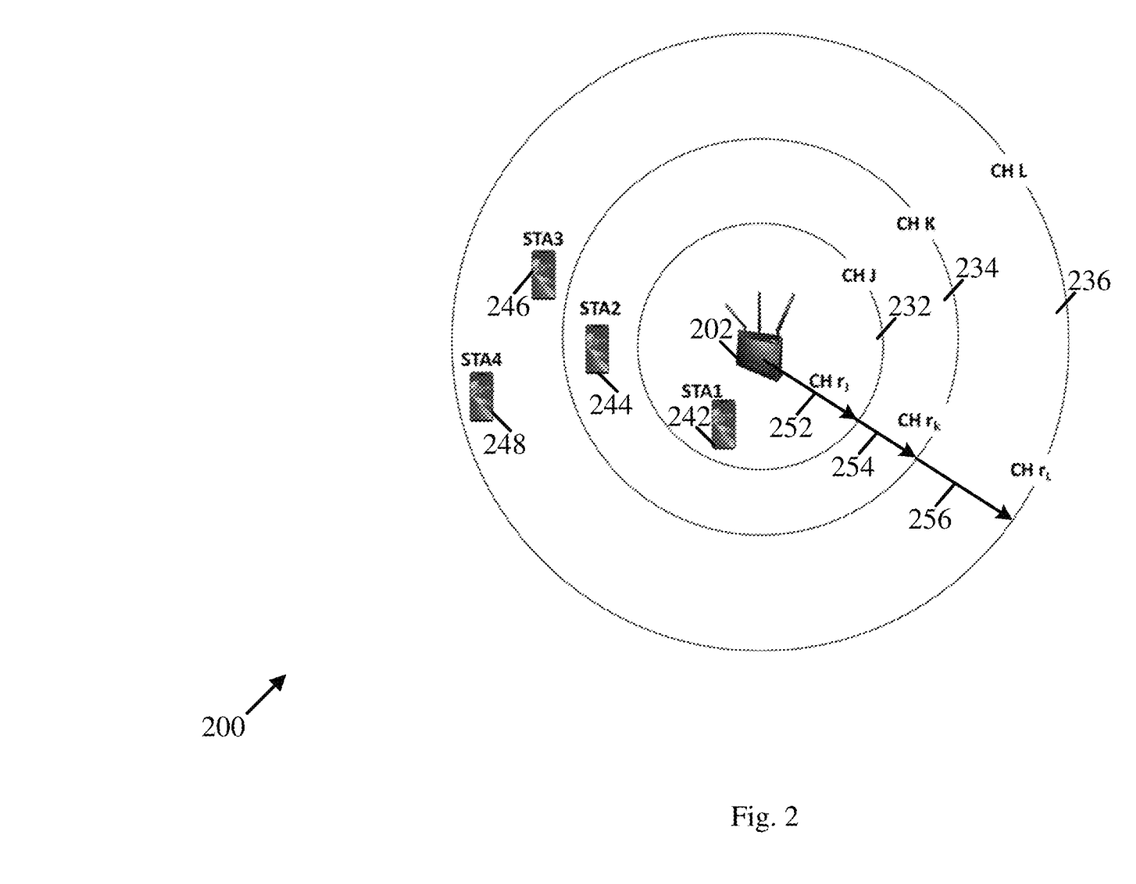
FIG. 2 is a schematic illustration of an Automated Frequency Coordination (AFC) allocation scheme, in accordance with some demonstrative aspects.

Reference is made to FIG. 2, which schematically illustrates an AFC allocation scheme 200, in accordance with some demonstrative aspects.

In some demonstrative aspects, an AP device 202 may include a co-located AP set, which may be configured to operate over a plurality of wireless communication channels, e.g., in the 6 GHz band. In one example, device 102 (FIG. 1) may include AP device 202, and/or may perform a role of, one or more operations of, and/or one or more functionalities of AP device 202.

In some demonstrative aspects, a plurality of APs AP device 202 may be configured to communicate over a respective plurality of wireless communication channels according to AFC allocation scheme 200.

For example, as shown in FIG. 2, a first AP of AP device 202 may be configured to communicate over a first wireless communication channel 252, denoted CHr$_J$; a second AP of AP device 202 may be configured to communicate over a second wireless communication channel 254, denoted CHr$_K$; and/or a third AP of AP device 202 may be configured to communicate over a first wireless communication channel 256, denoted CHr$_L$. For example, controller 124 (FIG. 1) may configure AP 135 (FIG. 1) to communicate over wireless communication channel 252, AP 137 (FIG. 1) to communicate over wireless communication channel 254, and/or AP 139 (FIG. 1) to communicate over wireless communication channel 256.

In some demonstrative aspects, the AFC allocation scheme 200 may include a plurality of AFC allocations for the plurality of wireless communication channels, respectively. For example, controller 124 (FIG. 1) may configure a first AFC allocation corresponding to wireless communication channel 252, a second AFC allocation corresponding to wireless communication channel 254, and/or a third AFC allocation corresponding to wireless communication channel 256.

In some demonstrative aspects, as shown in FIG. 2, the plurality of AFC allocations may be configured to corresponds to a plurality of different coverage areas relative to the AP device 102. For example, controller 124 (FIG. 1) may configure the AFC allocation for wireless communication channel 252 to correspond to a first coverage area 232 relative to the AP device 202, the AFC allocation for wireless communication channel 254 to correspond to a second coverage area 234 relative to the AP device 202, and/or the AFC allocation for wireless communication channel 256 to correspond to a third coverage area 236 relative to the AP device 202.

In some demonstrative aspects, as shown in FIG. 2, the coverage area 232 may cover a first range of distances from AP device 202, the coverage area 234 may cover a second range of distances from AP device 202, and/or the coverage area 236 may cover a third range of distances from AP device 202.

For example, as shown in FIG. 2, the third range of distances may be farther than the second range of distances, and the second range of distances may be farther than the first range of distances.

For example, as shown in FIG. 2, a maximal distance from AP device 202 according to the coverage area 236 may be greater than a maximal distance from AP device 202 according to the coverage area 234, and/or the maximal distance from AP device 202 according to the coverage area 234 may be greater than a maximal distance from AP device 202 according to the coverage area 232.

In some demonstrative aspects, as shown in FIG. 2, the plurality of coverage areas may be arranged in the form of a plurality of concentric rings, e.g., around the AP device 202.

In some demonstrative aspects, as shown in FIG. 2, the plurality of coverage areas may be arranged in the form of a plurality of non-overlapping concentric rings, e.g., around the AP device 202.

In other aspects, at least one of the coverage areas, e.g., some or all of the coverage areas, may have an overlap with at least one neighbor coverage area.

In other aspects, the plurality of coverage areas may be defined and/or arranged according to any other scheme.

In some demonstrative aspects, the AFC allocations for the wireless communication channels 252, 254 and/or 256 may include an allocation of a maximal Tx power. For example, the AFC allocation for wireless communication channel 252 may include an allocation of a first maximal Tx power for transmission over wireless communication channel 252, the AFC allocation for wireless communication channel 254 may include an allocation of a second maximal Tx power for transmission over wireless communication channel 254, and/or the AFC allocation for wireless communication channel 256 may include an allocation of a first maximal Tx power for transmission over wireless communication channel 256.

In some demonstrative aspects, the AP device 202 may be configured to dynamically assign one or more STAs to the wireless communication channels 252, 254 and/or 256, for example, based on locations of the STAs, e.g., in coverage areas 233, 234 and/236.

For example, AP device 202 may monitor the estimated distances between AP device 202 and a STA, and may instruct the STA to communicate with AP device 202 over an assigned wireless communication channel having an AFC allocation corresponding to a coverage area, which covers the estimated distance between the STA and the AP device.

For example, as shown in FIG. 2, AP device 202 may instruct a STA 242, which is located within coverage area 232, to communicate with AP device 202 over wireless communication channel 252 having an AFC allocation corresponding to the coverage area 232.

For example, as shown in FIG. 2, AP device 202 may instruct a STA 242, which is located within coverage area 242, to communicate with AP device 202 over wireless communication channel 254 having an AFC allocation corresponding to the coverage area 234.

For example, as shown in FIG. 2, AP device 202 may instruct a STA 246 and a STA 248, which are located within coverage area 236, to communicate with AP device 202 over wireless communication channel 256 having an AFC allocation corresponding to the coverage area 236.

In some demonstrative aspects, AP device 202 may monitor the estimated distances of STAs 243, 244, 246 and/or 248, for example, based on location measurement reports from STAs 243, 244, 246 and/or 248.

In some demonstrative aspects, one or more of the STAs 243, 244, 246 and/or 248, e.g., all of the STAs 243, 244, 246 and/or 248, may have an ongoing FTM session with AP device 202, and may send to AP device I2R LMR messages, e.g., periodically.

In some demonstrative aspects, AP device 202 may dynamically assign operating channels to the STAs 243, 244, 246 and/or 248, for example, based on the location measurement reports, e.g., such that that a STA is assigned to a wireless communication channel with an AFC allocation corresponding to the coverage area in which the STA is located.

In some demonstrative aspects, AP device 202 may be configured to identify movement of a STA between the coverage areas, and may instruct the STA to switch between communication channels based on the identified movement between the coverage areas.

In one example, AP device 202 may identify, e.g., based on the estimated distance between AP device 202 and STA 242, that the STA 242 has moved from a location within coverage area 232 to a location within coverage area 234. According to this example, AP device 202 may instruct STA 202 to switch to communicate with AP device 202 over wireless communication channel 254 having an AFC allocation corresponding to the coverage area 234.

Figure 3:
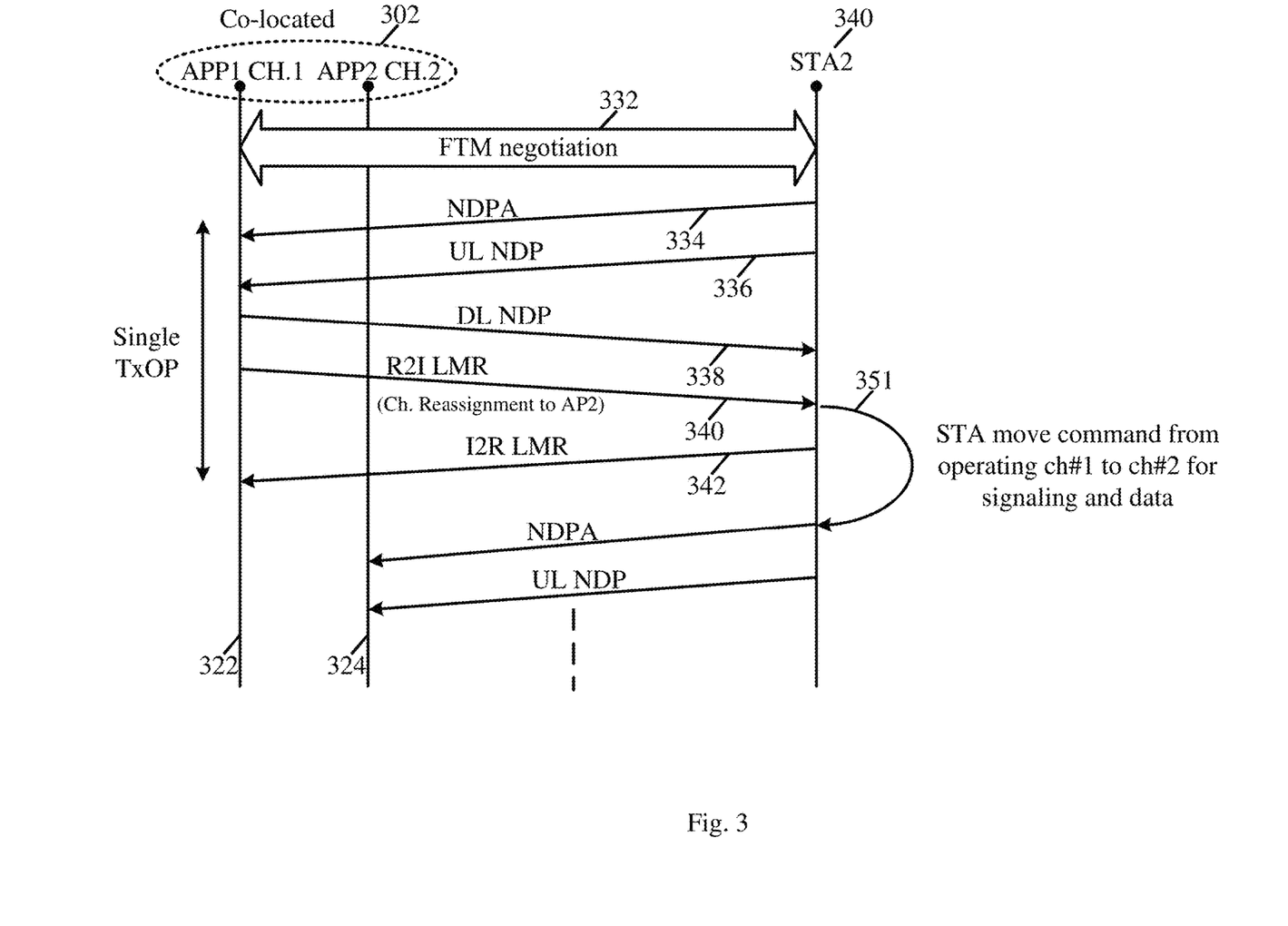
FIG. 3 is a schematic illustration of communications between a co-located Access Point (AP) set and a wireless communication station (STA), in accordance with some demonstrative aspects.

Reference is made to FIG. 3, which schematically illustrates communications between a co-located AP set 302 and a client STA 340, in accordance with some demonstrative aspects. For example, co-located AP set 131 (FIG. 1) of device 102 (FIG. 1) may include co-located AP set 302, and/or may perform a role of, one or more operations of, and/or one or more functionalities of co-located AP set 302. For example, device 140 (FIG. 1) may include co-located STA 340, and/or may perform a role of, one or more operations of, and/or one or more functionalities of client STA 340.

In some demonstrative aspects, co-located AP set 302 may include a first AP 322, which may be configured to operate on a first channel (CH1), and a second AP 324, which may be configured to operate on a second channel (CH2). In one example, controller 124 (FIG. 1) may configure AP 322 to operate on the channel CH1, for example, according to an AFC allocation corresponding to a first coverage area, e.g., coverage area 232 (FIG. 2); and AP 324 to operate on the channel CH2, for example, according to an AFC allocation corresponding to a second coverage area, e.g., coverage area 234 (FIG. 2), e.g., as described above.

In some demonstrative aspects, as shown in FIG. 3, client STA 340 may exchange one or more FTM negotiation messages with the AP 322 over the channel CH1, for example, to negotiate an FTM session with co-located AP set 302.

In some demonstrative aspects, as shown in FIG. 3, AP 322 may exchange with the client STA 340 messages of one or more FTM measurements over the channel CH1. For example, as shown in FIG. 3, the client STA 340 may transmit a Null-Data-Packet (NDP) Announcement (NDPA) 334 to the AP 322 over the channel CH1; the client STA 340 may transmit Uplink (UL) NDP 336 to the AP 322 over the channel CH1, e.g., after the NDPA 334; and the AP 322 may transmit to the client STA 340 a Downlink (DL) NDP 338 over the channel CH1.

In some demonstrative aspects, as shown in FIG. 3, the AP 322 may transmit to the client STA 340 a Responder to Initiator (R2I) LMR 340 including a command (35 to switch from the operating channel CH1 to the operating channel CH2 of the AP 324.

For example, controller 124 (FIG. 1) may make a decision to switch the client STA 340 from the channel CH1 to the channel CH2, for example, based on an identified change in the location of the client STA 340, e.g., from coverage area 232 (FIG. 2) to coverage area 234 (FIG. 2).

In some demonstrative aspects, as shown in FIG. 3, the client STA 340 may transmit to AP 322 an I2R LMR 342 over the channel CH1. For example, the I2R LMR 324 may include measurement information based on the exchange of the UL NDP 336 and the DL NDP 338 with AP 322 over the channel CH1.

In some demonstrative aspects, as shown in FIG. 3, the client STA 340 may switch (351) from communicating with the AP 322 over the channel CH1 to communicating with the AP 324 over the channel CH2.

In some demonstrative aspects, the AP 324 may continue the FTM procedure client STA 340, for example, without a new FTM negotiation. For example, the AP 324 may continue the FTM procedure client STA 340 base don the FTM negotiation 332, which was performed between client STA 340 and AP 322 over the channel CH1. For example, the operating channel for all activities of client STA is moved from AP 322 to AP 324.

Figure 4:
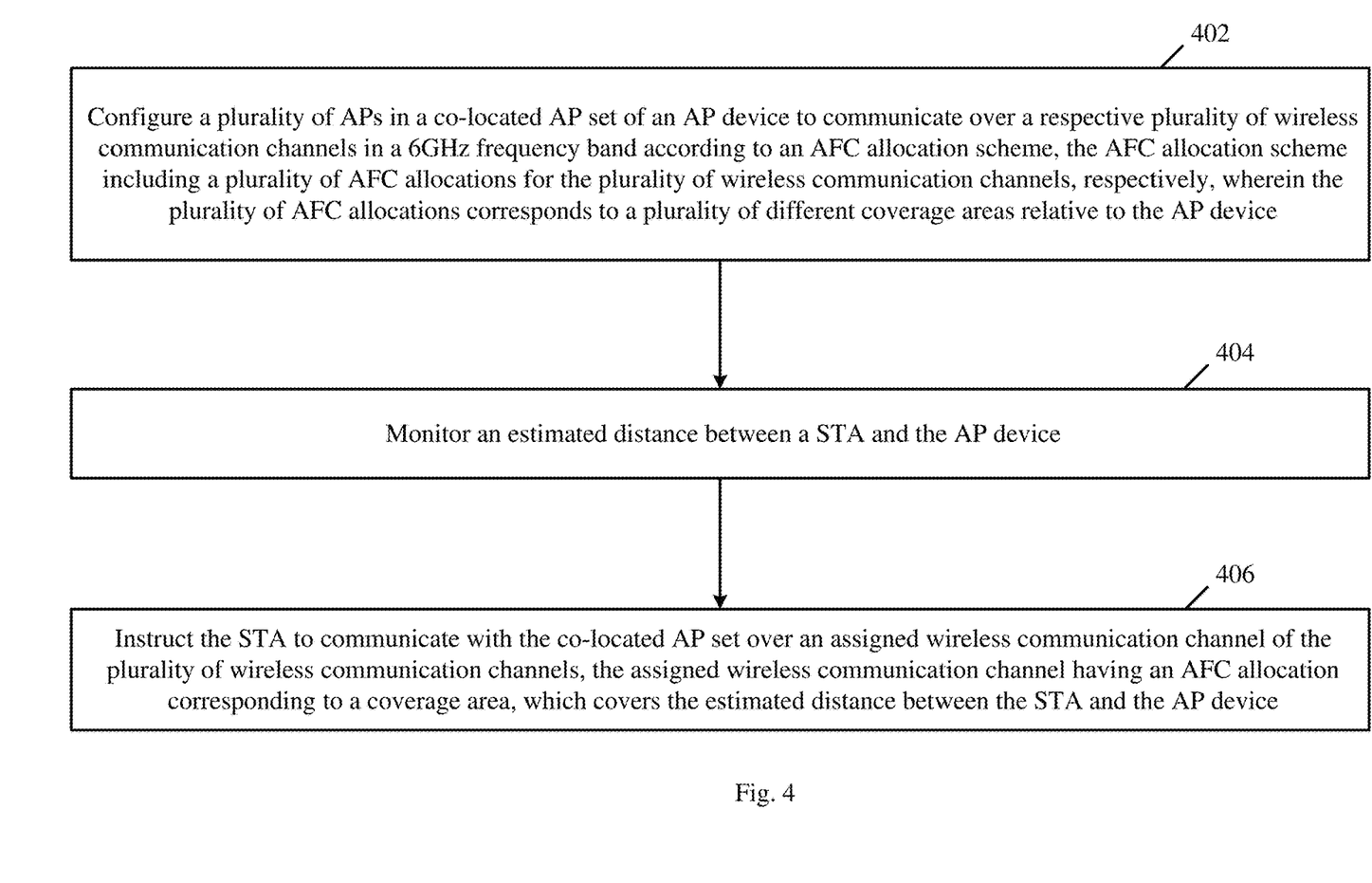
FIG. 4 is a schematic flow-chart illustration of a method of communication according to an AFC allocation scheme, in accordance with some demonstrative aspects.

FIG. 4 is a schematic flow-chart illustration of a method of communication according to an AFC allocation scheme, in accordance with some demonstrative aspects. For example, one or more of the operations of the method of FIG. 4 may be performed by one or more elements of a system, e.g., system 100 (FIG. 1), for example, device 102 (FIG. 1), a controller, e.g., controller 124 (FIG. 1), a co-located AP set, e.g., co-located AP set 131 (FIG. 1), a radio, e.g., radio 114 (FIG. 1), and/or a message processor, e.g., message processor 128 (FIG. 1).

As indicated at block 402, the method may include configuring a plurality of APs in a co-located AP set of an AP device to communicate over a respective plurality of wireless communication channels in a 6 GHz frequency band according to an AFC allocation scheme, the AFC allocation scheme including a plurality of AFC allocations for the plurality of wireless communication channels, respectively, wherein the plurality of AFC allocations corresponds to a plurality of different coverage areas relative to the AP device. For example, controller 124 (FIG. 1) may be configured to cause, trigger, and/or control APs 133 (FIG. 1) to communicate over the plurality of channels according to the AFC allocation scheme, e.g., as described above.

As indicated at block 404, the method may include monitoring an estimated distance between a STA and the AP device. For example, controller 124 (FIG. 1) may be configured to monitor the estimated distance between device 140 (FIG. 1) and device 102 (FIG. 1), e.g., as described above.

As indicated at block 406, the method may include instructing the STA to communicate with the co-located AP set over an assigned wireless communication channel of the plurality of wireless communication channels, the assigned wireless communication channel having an AFC allocation corresponding to a coverage area, which covers the estimated distance between the STA and the AP device. For example, controller 124 (FIG. 1) may be configured to cause, trigger, and/or control device 102 (FIG. 1) to instruct device 140 (FIG. 1) to communicate with co-located AP set 131 (FIG. 1) over the selected channel based on the estimated distance between device 140 (FIG. 1) and device 102 (FIG. 1), e.g., as described above.

Figure 5:
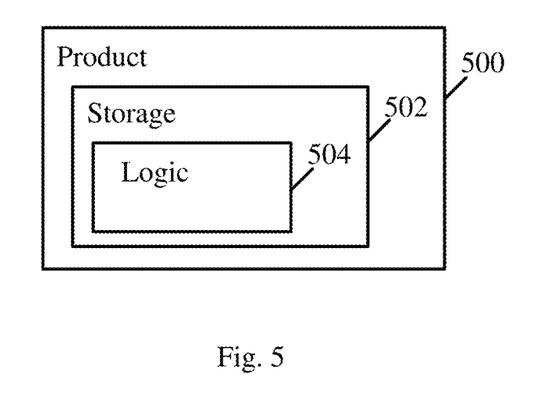
FIG. 5 is a schematic illustration of a product of manufacture, in accordance with some demonstrative aspects.

Reference is made to FIG. 5, which schematically illustrates a product of manufacture 500, in accordance with some demonstrative aspects. Product 500 may include one or more tangible computer-readable ("machine-readable") non-transitory storage media 502, which may include computer-executable instructions, e.g., implemented by logic 504, operable to, when executed by at least one computer processor, enable the at least one computer processor to implement one or more operations at device 102 (FIG. 1), controller 124 (FIG. 1), co-located AP set 131 (FIG. 1), radio 114 (FIG. 1), and/or message processor 128 (FIG. 1), to cause device 102 (FIG. 1), controller 124 (FIG. 1), co-located AP set 131 (FIG. 1), radio 114 (FIG. 1), and/or message processor 128 (FIG. 1) to perform, trigger and/or implement one or more operations and/or functionalities, and/or to perform, trigger and/or implement one or more operations and/or functionalities described with reference to the FIGS. 1, 2, 3, and/or 4, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 500 and/or machine readable storage media 502 may include one or more types of computer-readable storage media capable of storing data, including volatile memory, non-volatile memory, removable or non-removable memory, erasable or non-erasable memory, writeable or rewriteable memory, and the like. For example, machine readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising logic and circuitry configured to cause an Access Point (AP) device, which includes a co-located AP set of a plurality of APs, to configure the plurality of APs to communicate over a respective plurality of wireless communication channels in a 6 Gigahertz (GHz) frequency band according to an Automated Frequency Coordination (AFC) allocation scheme, the AFC allocation scheme comprising a plurality of AFC allocations for the plurality of wireless communication channels, respectively, wherein the plurality of AFC allocations corresponds to a plurality of different coverage areas relative to the AP device, an AFC allocation for a wireless communication channel comprising an allocation of a maximal Transmit (Tx) power for transmission over the wireless communication channel; monitor an estimated distance between a wireless communication station (STA) and the AP device; and instruct the STA to communicate with the co-located AP set over an assigned wireless communication channel of the plurality of wireless communication channels, the assigned wireless communication channel having an AFC allocation corresponding to a coverage area, which covers the estimated distance between the STA and the AP device.

Example 2 includes the subject matter of Example 1, and optionally, wherein the apparatus is configured to cause the AP device to, based on an identified movement of the STA between the coverage areas, instruct the STA to switch between communication channels of the plurality of wireless communication channels for communication with the co-located AP set.

Example 3 includes the subject matter of Example 1 or 2, and optionally, wherein the apparatus is configured to cause the AP device to instruct the STA to communicate with the co-located AP set over a first assigned wireless communication channel according to a first AFC allocation corresponding to a first coverage area, when the estimated distance between the STA and the AP device is in the first coverage area, and to instruct the STA to switch to communicate with the co-located AP set over a second assigned wireless communication channel according to a second AFC allocation corresponding to a second coverage area, when the estimated distance between the STA and the AP device is in the second coverage area.

Example 4 includes the subject matter of Example 3, and optionally, wherein a maximal distance from the AP device according to the second coverage area is greater than a maximal distance from the AP device according to the first coverage area, and wherein a maximal Tx power according to the first AFC allocation is greater than a maximal Tx power according to the second AFC allocation.

Example 5 includes the subject matter of any one of Examples 1-4, and optionally, wherein the apparatus is configured to determine the estimated distance between the STA and the AP device based on a location measurement report from the STA.

Example 6 includes the subject matter of Example 5, and optionally, wherein the apparatus is configured to cause an AP of the plurality of APs to send to the STA a request for the location measurement report, the request for the location measurement report comprising a reason indication to indicate that the location measurement report is requested to support the AFC allocation scheme.

Example 7 includes the subject matter of Example 5 or 6, and optionally, wherein the location measurement report from the STA is based on an exchange of messages of a ranging measurement between an AP of the plurality of APs and the STA.

Example 8 includes the subject matter of any one of Examples 5-7, and optionally, wherein the location measurement report from the STA comprises an Initiator-to-Responder (I2R) Location Measurement Report (LMR) based on an exchange of messages of a Fine Timing Measurement (FTM) protocol between an AP of the plurality of APs and the STA.

Example 9 includes the subject matter of any one of Examples 1-8, and optionally, wherein the AFC allocation for the wireless communication channel is based on a maximal distance in a coverage range corresponding to the wireless communication channel.

Example 10 includes the subject matter of any one of Examples 1-9, and optionally, wherein the plurality of AFC allocations corresponds to a plurality of different uncertainty values, respectively, applied to a same AP location value.

Example 11 includes the subject matter of any one of Examples 1-10, and optionally, comprising one or more radios to communicate over the plurality of wireless communication channels.

Example 12 includes the subject matter of Example 11, and optionally, comprising one or more antennas connected to the one or more radios, and a processor to execute instructions of an operating system of the AP device.

Example 13 comprises an apparatus comprising means for executing any of the described operations of Examples 1-12.

Example 14 comprises a product comprising one or more tangible computer-readable non-transitory storage media comprising computer-executable instructions operable to, when executed by at least one processor, enable the at least one processor to cause a computing device to perform any of the described operations of Examples 1-12.

Example 15 comprises an apparatus comprising: a memory interface; and processing circuitry configured to: perform any of the described operations of Examples 1-12.

Example 16 comprises a method comprising any of the described operations of Examples 1-12.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause an Access Point (AP) device, which includes a co-located AP set of a plurality of APs, to:
    configure the plurality of APs to communicate over a respective plurality of wireless communication channels in a 6 Gigahertz (GHz) frequency band according to an Automated Frequency Coordination (AFC) allocation scheme, the AFC allocation scheme comprising a plurality of AFC allocations for the plurality of wireless communication channels, respectively, wherein the plurality of AFC allocations corresponds to a plurality of different coverage areas relative to the AP device, an AFC allocation for a wireless communication channel comprising an allocation of a maximal Transmit (Tx) power for transmission over the wireless communication channel;
    monitor an estimated distance between a wireless communication station (STA) and the AP device; and
    instruct the STA to communicate with the co-located AP set over an assigned wireless communication channel of the plurality of wireless communication channels, the assigned wireless communication channel having an AFC allocation corresponding to a coverage area, which covers the estimated distance between the STA and the AP device.

2. The apparatus of claim 1 configured to cause the AP device to, based on an identified movement of the STA between the coverage areas, instruct the STA to switch between communication channels of the plurality of wireless communication channels for communication with the co-located AP set.

3. The apparatus of claim 1 configured to cause the AP device to instruct the STA to communicate with the co-located AP set over a first assigned wireless communication channel according to a first AFC allocation corresponding to a first coverage area, when the estimated distance between the STA and the AP device is in the first coverage area, and to instruct the STA to switch to communicate with the co-located AP set over a second assigned wireless communication channel according to a second AFC allocation corresponding to a second coverage area, when the estimated distance between the STA and the AP device is in the second coverage area.

4. The apparatus of claim 3, wherein a maximal distance from the AP device according to the second coverage area is greater than a maximal distance from the AP device according to the first coverage area, and wherein a maximal Tx power according to the first AFC allocation is greater than a maximal Tx power according to the second AFC allocation.

5. The apparatus of claim 1 configured to determine the estimated distance between the STA and the AP device based on a location measurement report from the STA.

6. The apparatus of claim 5 configured to cause an AP of the plurality of APs to send to the STA a request for the location measurement report, the request for the location measurement report comprising a reason indication to indicate that the location measurement report is requested to support the AFC allocation scheme.

7. The apparatus of claim 5, wherein the location measurement report from the STA is based on an exchange of messages of a ranging measurement between an AP of the plurality of APs and the STA.

8. The apparatus of claim 5, wherein the location measurement report from the STA comprises an Initiator-to-Responder (I2R) Location Measurement Report (LMR) based on an exchange of messages of a Fine Timing Measurement (FTM) protocol between an AP of the plurality of APs and the STA.

9. The apparatus of claim 1, wherein the AFC allocation for the wireless communication channel is based on a maximal distance in a coverage range corresponding to the wireless communication channel.

10. The apparatus of claim 1, wherein the plurality of AFC allocations corresponds to a plurality of different uncertainty values, respectively, applied to a same AP location value.

11. The apparatus of claim 1 comprising one or more radios to communicate over the plurality of wireless communication channels.

12. The apparatus of claim 11 comprising one or more antennas connected to the one or more radios, and a processor to execute instructions of an operating system of the AP device.

13. A product comprising one or more tangible computer-readable non-transitory storage media comprising computer-executable instructions operable to, when executed by at least one processor, enable the at least one processor to cause an Access Point (AP) device, which includes a co-located AP set of a plurality of APs, to:
    configure the plurality of APs to communicate over a respective plurality of wireless communication channels in a 6 Gigahertz (GHz) frequency band according to an Automated Frequency Coordination (AFC) allocation scheme, the AFC allocation scheme comprising a plurality of AFC allocations for the plurality of wireless communication channels, respectively, wherein the plurality of AFC allocations corresponds to a plurality of different coverage areas relative to the AP device, an AFC allocation for a wireless communication channel comprising an allocation of a maximal Transmit (Tx) power for transmission over the wireless communication channel;
    monitor an estimated distance between a wireless communication station (STA) and the AP device; and instruct the STA to communicate with the co-located AP set over an assigned wireless communication channel of the plurality of wireless communication channels, the assigned wireless communication channel having an AFC allocation corresponding to a coverage area, which covers the estimated distance between the STA and the AP device.

14. The product of claim 13, wherein the instructions, when executed, cause the AP device to, based on an identified movement of the STA between the coverage areas, instruct the STA to switch between communication channels of the plurality of wireless communication channels for communication with the co-located AP set.

15. The product of claim 13, wherein the instructions, when executed, cause the AP device to instruct the STA to communicate with the co-located AP set over a first assigned wireless communication channel according to a first AFC allocation corresponding to a first coverage area, when the estimated distance between the STA and the AP device is in the first coverage area, and to instruct the STA to switch to communicate with the co-located AP set over a second assigned wireless communication channel according to a second AFC allocation corresponding to a second coverage area, when the estimated distance between the STA and the AP device is in the second coverage area.

16. The product of claim 15, wherein a maximal distance from the AP device according to the second coverage area is greater than a maximal distance from the AP device according to the first coverage area, and wherein a maximal Tx power according to the first AFC allocation is greater than a maximal Tx power according to the second AFC allocation.

17. The product of claim 13, wherein the instructions, when executed, cause the AP device to determine the estimated distance between the STA and the AP device based on a location measurement report from the STA.

18. The product of claim 17, wherein the instructions, when executed, cause an AP of the plurality of APs to send to the STA a request for the location measurement report, the request for the location measurement report comprising a reason indication to indicate that the location measurement report is requested to support the AFC allocation scheme.

19. The product of claim 17, wherein the location measurement report from the STA is based on an exchange of messages of a ranging measurement between an AP of the plurality of APs and the STA.

20. The product of claim 17, wherein the location measurement report from the STA comprises an Initiator-to-Responder (I2R) Location Measurement Report (LMR) based on an exchange of messages of a Fine Timing Measurement (FTM) protocol between an AP of the plurality of APs and the STA.

21. The product of claim 13, wherein the AFC allocation for the wireless communication channel is based on a maximal distance in a coverage range corresponding to the wireless communication channel.

22. The product of claim 13, wherein the plurality of AFC allocations corresponds to a plurality of different uncertainty values, respectively, applied to a same AP location value.

23. An apparatus comprising:
means for causing an Access Point (AP) device, which includes a co-located AP set of a plurality of APs, to configure the plurality of APs to communicate over a respective plurality of wireless communication channels in a 6 Gigahertz (GHz) frequency band according to an Automated Frequency Coordination (AFC) allocation scheme, the AFC allocation scheme comprising a plurality of AFC allocations for the plurality of wireless communication channels, respectively, wherein the plurality of AFC allocations corresponds to a plurality of different coverage areas relative to the AP device, an AFC allocation for a wireless communication channel comprising an allocation of a maximal Transmit (Tx) power for transmission over the wireless communication channel;
means for causing the AP device to monitor an estimated distance between a wireless communication station (STA) and the AP device; and
means for causing the AP device to instruct the STA to communicate with the co-located AP set over an assigned wireless communication channel of the plurality of wireless communication channels, the assigned wireless communication channel having an AFC allocation corresponding to a coverage area, which covers the estimated distance between the STA and the AP device.

24. The apparatus of claim 23 comprising means for causing the AP device to, based on an identified movement of the STA between the coverage areas, instruct the STA to switch between communication channels of the plurality of wireless communication channels for communication with the co-located AP set.

25. The apparatus of claim 23 comprising means for causing the AP device to instruct the STA to communicate with the co-located AP set over a first assigned wireless communication channel according to a first AFC allocation corresponding to a first coverage area, when the estimated distance between the STA and the AP device is in the first coverage area, and to instruct the STA to switch to communicate with the co-located AP set over a second assigned wireless communication channel according to a second AFC allocation corresponding to a second coverage area, when the estimated distance between the STA and the AP device is in the second coverage area.

* * * * *